UNITED STATES PATENT OFFICE.

MAX GLASS, OF VIENNA, AUSTRIA-HUNGARY.

PROCESS OF BRIQUETING FINES OF ORE, FURNACE-DUST, WASTE METAL, WASTE IRON, &c.

958,623.   Specification of Letters Patent.   Patented May 17, 1910.

No Drawing.   Application filed December 11, 1909. Serial No. 532,603.

*To all whom it may concern:*

Be it known that I, MAX GLASS, a subject of the Emperor of Austria-Hungary, residing at 176 Hadikgasse, Vienna, Austria-Hungary, have invented certain new and useful Improvements in Processes of Briqueting Fines of Ore, Furnace-Dust, Waste Metal, Waste Iron, and Like Materials; and I do hereby declare the following to be a full, clear, and exact description of the invention.

The subject-matter of my invention is an improved process of briqueting fines of ore, furnace-dust, waste metal, waste iron and like materials, such as smelting-products, ores in pieces or in granular or powdered condition as well as waste material containing iron, and consists in adding to the material solutions as binding agent, whose basic salts enable the material to be briqueted owing to the product maintaining its consistency sufficiently long under the action of the blast and of the heat of the smelting-furnace. Processes known heretofore for obtaining such briquets were too troublesome and expensive, as the material first had to be carbonized with organic binding agents or the briqueting operation itself had to take place in heat. Now according to my invention these basic salts which enable the material to be bound can be incorporated in the mass to be briqueted by introducing into the same salts which when treated in the mass, possibly with the coöperation of the basic material "lime," form compounds insoluble in water (basic acetate or silicate) as binding means, the lime being also able to coöperate simultaneously in removing excess of moisture.

The subject-matter of my invention and the mode of carrying it into practice will now be described with reference to the following examples: When acetate is used the process may be executed by mixing the iron material which is to be briqueted with acetate of alumina in the following proportions: 1 kg. iron material is mixed with 10 cms. of a solution of anhydrous acetate of alumina containing five to eight per cent. aluminium acetate in one liter of water, subjected to the pressure of a hydraulic press, and, after being pressed, heated to about 100° C. The basic aluminium acetate serving as cement between the individual iron particles is precipitated and acetic acid is simultaneously liberated. The reaction during this process is as follows:

I. 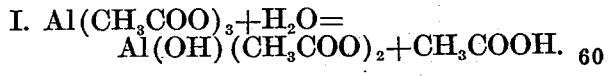

The free acetic acid now itself dissolves iron and forms with the same ferroacetate according to the following equation:

II. 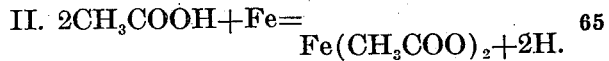

The ferroacetate produced is oxidized further partially to ferriacetate $Fe(CH_3COO)_3$ and partially to ferric oxid $(Fe_2O_3)$ by the atmospheric oxygen which is present:

III. 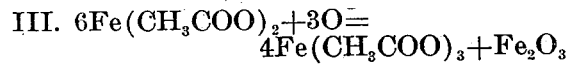

and

IV. 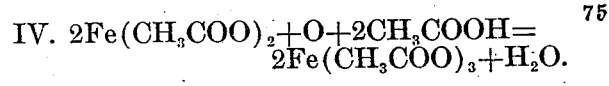

The ferriacetate which is formed, however, is converted with the water which is present under the action of the heat into basic acetate of iron which aids the action of the basic aluminium salt and likewise exercises a binding action on the iron material. This reaction takes place as follows:

V. 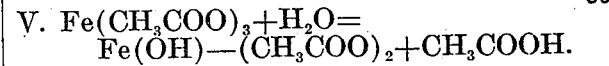

The acetic acid liberated during the process is gradually volatilized and the above described binding process continues until no free acetic acid is present. At this moment the reaction is finished.

My process may also be carried into practice by adding quicklime to the material mixed with aluminium acetate and then leaving to themselves the briquets after they have been pressed. In this mode of briqueting special heating of the material is superfluous as the added quicklime at once takes up the water, is quenched thereby and the heat of absorption which, of course, is produced serves for starting and continuing the process, *i. e.* for forming basic aluminium acetate. The formation of basic aluminium acetate takes place as follows:

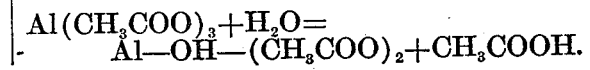

The acetic acid which is liberated is then at once bound as calcium acetate by the added quicklime, the formation of ferroacetate and the reactions connected therewith not taking place.

VI. 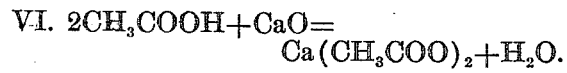
$$2CH_3COOH + CaO = Ca(CH_3COO)_2 + H_2O.$$

Various modifications of the process will readily suggest themselves, certain of said modifications forming the subject matter of divisional applications filed by me, and I do not limit myself to the particular process described, but claim as my invention:—

1. In the process of briqueting ores, the cementing together of the ore particles by a cementitious compound insoluble in water formed of a basic salt, substantially as described.

2. In the process of briqueting ores, the cementing together of the ore particles by a cementitious compound formed of a basic metallic salt, substantially as described.

3. In the process of briqueting ores, the cementing together of the ore particles by a cementitious compound insoluble in water, formed of a basic acetate, substantially as described.

4. The herein described process of briqueting ores which consists in mixing a solution of acetate of aluminum with the material to be briqueted, pressing the mass thus obtained and heating to a temperature of approximately 100° C., whereby basic aluminum acetate is formed and acts as a cement, substantially as described.

5. The herein described process of briqueting ores which consists in mixing a solution of acetate of aluminum with the material to be briqueted, pressing the mass thus obtained and heating to a temperature of approximately 100° C. by quicklime added to the mass before pressing, whereby basic aluminum acetate is formed and acts as a cement, substantially as described.

6. A briquet having its particles held together by a cementitious compound insoluble in water formed of a basic salt, substantially as described.

7. A briquet having its particles held together by a cementitious compound insoluble in water formed of a basic acetate, substantially as described.

8. A briquet having its particles held together by a cementitious compound insoluble in water formed of a basic aluminum acetate, substantially as described.

9. A briquet having its particles held together by a cementitious compound formed of a basic metallic salt, substantially as described.

In testimony that I claim the foregoing as my invention I have signed my name in presence of two subscribing witnesses.

MAX GLASS.

Witnesses:
 ROBERT W. HEINGARTNER,
 AUGUST FUZZER.